US 8,370,315 B1
Feb. 5, 2013

(12) United States Patent
Efstathopoulos et al.

(54) SYSTEM AND METHOD FOR HIGH PERFORMANCE DEDUPLICATION INDEXING

(75) Inventors: Petros Efstathopoulos, Los Angeles, CA (US); Fanglu Guo, Los Angeles, CA (US)

(73) Assignee: Symantec Corporation, Mountain View, CA (US)

( * ) Notice: Subject to any disclaimer, the term of this patent is extended or adjusted under 35 U.S.C. 154(b) by 157 days.

(21) Appl. No.: 12/790,461

(22) Filed: May 28, 2010

(51) Int. Cl.
*G06F 7/00* (2006.01)
*G06F 17/00* (2006.01)
*G06F 17/30* (2006.01)

(52) U.S. Cl. ......... 707/696; 707/697; 707/699; 707/769

(58) Field of Classification Search .................. 707/696, 707/697, 699, 715, 769
See application file for complete search history.

(56) References Cited

U.S. PATENT DOCUMENTS

| | | | |
|---|---|---|---|
| 5,276,860 A | 1/1994 | Fortier et al. | |
| 5,535,381 A | 7/1996 | Kopper | |
| 5,555,371 A | 9/1996 | Duyanovich et al. | |
| 5,559,991 A | 9/1996 | Kanfi | |
| 5,561,421 A | 10/1996 | Smith | |
| 5,835,953 A | 11/1998 | Ohran | |
| 5,990,810 A | 11/1999 | Williams | |
| 5,991,542 A | 11/1999 | Han et al. | |
| 6,014,676 A | 1/2000 | McClain | |
| 6,029,168 A | 2/2000 | Frey | |
| 6,085,298 A | 7/2000 | Ohran | |
| 6,101,585 A | 8/2000 | Brown et al. | |
| 6,141,784 A | 10/2000 | Davis | |
| 6,148,382 A * | 11/2000 | Bitner et al. ................. | 711/162 |
| 6,360,330 B1 | 3/2002 | Mutalik et al. | |
| 6,389,433 B1 | 5/2002 | Bolosky et al. | |
| 6,513,051 B1 | 1/2003 | Bolosky et al. | |
| 6,542,962 B2 | 4/2003 | Kodama et al. | |
| 6,640,278 B1 | 10/2003 | Nolan et al. | |
| 6,665,815 B1 | 12/2003 | Goldstein et al. | |
| 6,714,952 B2 | 3/2004 | Dunham et al. | |

(Continued)

FOREIGN PATENT DOCUMENTS

EP 838758 4/1998

OTHER PUBLICATIONS

U.S. Appl. No. 11/404,105 entitled Routing, filed Apr. 13, 2006.

(Continued)

*Primary Examiner* — Merilyn Nguyen
(74) *Attorney, Agent, or Firm* — Rory D. Rankin; Meyertons, Hood, Kivlin, Kowert & Kowert & Goetzel, P.C.

(57) ABSTRACT

A system and method for efficiently reducing latency of accessing an index for a data segment stored on a server. A server both removes duplicate data and prevents duplicate data from being stored in a shared data storage. The file server is coupled to an index storage subsystem holding fingerprint and pointer value pairs corresponding to a data segment stored in the shared data storage. The pairs are stored in a predetermined order. The file server utilizes an ordered binary search tree to identify a particular block of multiple blocks within the index storage subsystem corresponding to a received memory access request. The index storage subsystem determines whether an entry corresponding to the memory access request is located within the identified block. Based on at least this determination, the file server processes the memory access request accordingly. In one embodiment, the index storage subsystem is a solid-state disk (SSD).

17 Claims, 5 Drawing Sheets

U.S. PATENT DOCUMENTS

| | | | |
|---|---|---|---|
| 6,785,786 B1* | 8/2004 | Gold et al. | 711/162 |
| 6,829,688 B2 | 12/2004 | Grubbs et al. | |
| 6,847,983 B2 | 1/2005 | Somalwar et al. | |
| 6,865,655 B1 | 3/2005 | Andersen | |
| 6,880,051 B2 | 4/2005 | Timpanaro-Perrotta | |
| 6,910,112 B2 | 6/2005 | Berkowitz et al. | |
| 6,912,645 B2* | 6/2005 | Dorward et al. | 711/216 |
| 6,920,537 B2 | 7/2005 | Ofek et al. | |
| 6,938,135 B1 | 8/2005 | Kekre et al. | |
| 6,976,039 B2 | 12/2005 | Chefalas et al. | |
| 6,983,365 B1 | 1/2006 | Douceur et al. | |
| 7,055,008 B2 | 5/2006 | Niles | |
| 7,136,976 B2 | 11/2006 | Saika | |
| 7,146,429 B2 | 12/2006 | Michel | |
| 7,200,604 B2 | 4/2007 | Forman et al. | |
| 7,213,158 B2 | 5/2007 | Bantz et al. | |
| 7,257,104 B2 | 8/2007 | Shitama | |
| 7,257,643 B2 | 8/2007 | Mathew | |
| 7,310,644 B2 | 12/2007 | Adya et al. | |
| 7,318,072 B2 | 1/2008 | Margolus | |
| 7,359,920 B1 | 4/2008 | Rybicki et al. | |
| 7,389,394 B1 | 6/2008 | Karr | |
| 7,401,194 B2 | 7/2008 | Jewell | |
| 7,409,523 B2 | 8/2008 | Pudipeddi | |
| 7,424,514 B2 | 9/2008 | Noble et al. | |
| 7,454,592 B1 | 11/2008 | Shah | |
| 7,478,113 B1 | 1/2009 | De Spiegeleer et al. | |
| 7,529,785 B1 | 5/2009 | Spertus et al. | |
| 7,747,581 B1* | 6/2010 | Li et al. | 707/686 |
| 8,140,602 B2* | 3/2012 | Hsu et al. | 707/821 |
| 2001/0045962 A1 | 11/2001 | Lee | |
| 2002/0107877 A1 | 8/2002 | Whiting et al. | |
| 2003/0018878 A1* | 1/2003 | Dorward et al. | 711/216 |
| 2003/0163495 A1 | 8/2003 | Lanzatella et al. | |
| 2003/0177149 A1 | 9/2003 | Coombs | |
| 2004/0044707 A1 | 3/2004 | Richard | |
| 2004/0143731 A1 | 7/2004 | Audebert et al. | |
| 2004/0268068 A1 | 12/2004 | Curran et al. | |
| 2005/0027766 A1 | 2/2005 | Ben | |
| 2005/0198328 A1 | 9/2005 | Lee et al. | |
| 2005/0204108 A1 | 9/2005 | Ofek | |
| 2005/0216788 A1 | 9/2005 | Mani-Meitav et al. | |
| 2005/0216813 A1 | 9/2005 | Cutts et al. | |
| 2006/0026219 A1 | 2/2006 | Orenstein et al. | |
| 2006/0184587 A1 | 8/2006 | Federwisch et al. | |
| 2006/0271540 A1* | 11/2006 | Williams | 707/7 |
| 2007/0192548 A1* | 8/2007 | Williams | 711/154 |
| 2007/0198659 A1 | 8/2007 | Lam | |
| 2007/0250674 A1 | 10/2007 | Fineberg et al. | |
| 2008/0005141 A1* | 1/2008 | Zheng et al. | 707/101 |
| 2008/0133561 A1 | 6/2008 | Dubnicki et al. | |
| 2008/0154989 A1 | 6/2008 | Arman | |
| 2008/0228939 A1* | 9/2008 | Samuels et al. | 709/235 |
| 2008/0243769 A1 | 10/2008 | Arbour et al. | |
| 2008/0243953 A1 | 10/2008 | Wu et al. | |
| 2008/0244204 A1 | 10/2008 | Cremelie et al. | |
| 2010/0083003 A1* | 4/2010 | Spackman | 713/193 |
| 2010/0250896 A1* | 9/2010 | Matze | 711/216 |
| 2010/0257403 A1 | 10/2010 | Virk et al. | |
| 2010/0274982 A1 | 10/2010 | Mehr et al. | |
| 2010/0332452 A1* | 12/2010 | Hsu et al. | 707/640 |
| 2011/0093439 A1* | 4/2011 | Guo et al. | 707/679 |
| 2011/0225191 A1* | 9/2011 | Xie | 707/775 |

OTHER PUBLICATIONS

U.S. Appl. No. 11/403,379 entitled Parallel Backup, filed Apr. 13, 2006.

U.S. Appl. No. 11/641,389, filed Dec. 18, 2006 entitled "Single Instance Storage".

"Windows DDK Glossary," http://msdn.microsoft.com/library/default.asp?url=/library/en-us/gloss/hh- /gloss/glossary. sub.—628b1dfc-c8f0-4143-a4ef-0dddae24be4b.xml.asp, (3 pages).

"Repliweb R-1 User Guide—Version 3.1," RepliWeb, Inc., 2002, (27 pages).

"FilesX Xchange RestoreTM for Microsoft Exchange Server," FilesX, Inc., Aug. 2003, (2 pages).

"Instructor Articles," Veritas Education, pp. 1-7, Apr. 2003.

"EMC TimeFinder Family," EMC Corporation, 8 pages, Oct. 2004.

"EMC TimeFinder Local Replication," EMC Corporation, 2 pages, Oct. 2004.

"Storage Area Networking-High-Speed Data Sharing Among Multiple Computer Platforms", Tivoli Systems, Inc., Copyright 2000. ftp://ftp.software.ibm.com/software/tivoli/whitepapers/san_datasharing_wp.pdf, (2000), 4 pages.

"Storage Management-Best Practices", Copyright 2001, IBM Corp., ftp://ftp.software.ibm.com/software/tivoli/whitepapers/wp-storage-bp.pdf, (2001), 11 pages.

Amiri, Khalil S., "Scalable and manageable storage systems", Ph.D. Thesis, Dept. of Electrical and Computer Engineering, Carnegie Mellon University, Pittsburgh, PA, http://www.pdl.cmu.edu/PDL-FTP/NASD/amiri_thesis.pdf, (Dec. 2000), i-241 pgs.

Wylie, Jay J., et al., "Selecting the Right Data Distribution Scheme for a Survivable Storage System", Research Paper, School of Computer Science, Carnegie Mellon University, Pittsburgh, PA, http://www.pdl.cmu.edu/PDL-FTP/Storage/CMU-CS-01-120.pdf, May 2001), pp. 1-21.

* cited by examiner

SYSTEM AND METHOD FOR HIGH PERFORMANCE DEDUPLICATION INDEXING

BACKGROUND OF THE INVENTION

1. Field of the Invention

This invention relates to computer systems and, more particularly, to reducing latency of accessing an index for a number of data blocks stored on a server.

2. Description of the Related Art

Computer systems frequently include data storage subsystems for storing data. In particular, computer systems that include multiple clients interconnected by a network increasingly share one or more data storage subsystems via a network. The shared storage may include or be further coupled to storage consisting of one or more disk storage devices, tape drives, or other storage media. Shared storage of modern computer systems typically holds a large amount of data. Efficient storage of this large amount of data may be desired in order for a modern business to effectively execute various processes.

One method of efficiently storing data includes data deduplication, which attempts to reduce the storage of redundant data. Deduplication mechanisms may both remove duplicate data already stored in shared storage and disallow duplicate data from being stored in shared storage. Accordingly, one copy of unique data may be stored, which reduces the shared storage capacity. Indexing of all data in the computing system may be retained should the redundant data ever be requested. For example, data may be partitioned into blocks of data and a hash computation may be performed for each block. One of several hashing techniques that are well known may be used. A corresponding hash value, or fingerprint, of data associated with a read/write access to the shared storage may be compared to fingerprints of data already stored in the shared storage. The comparisons of fingerprints may utilize a storage of fingerprints, such as in a random access memory (RAM) or otherwise. The storage of fingerprints may be referred to as a fingerprint index, or index.

As data storage grows, it may be difficult to maintain an index capable of storing fingerprints of all data blocks known to be stored in the shared storage. Since a computer system's storage capacity is typically very large, an index may also be very large. The resulting index may not fit in supplied RAM. Additionally, if a portion of the associated fingerprints is stored in storage such as a disk storage, performance may suffer. The disk access speeds may not be fast enough to keep up with the rate of index requests.

In view of the above, systems and methods for efficiently reducing latency of accessing an index for a data segment stored on a server are desired.

SUMMARY OF THE INVENTION

Various embodiments of a computer system and methods for efficiently reducing latency of accessing an index for a data segment stored on a server are disclosed. In one embodiment, client devices are coupled to a shared data storage via a file server. The file server comprises a deduplication software application that may be configured to remove duplicate data already stored in the shared data storage. Also, the application may be configured to prevent duplicate data from being stored in the shared data storage. The file server may be coupled to an index storage subsystem separate from the shared data storage. The index storage subsystem may comprise a plurality of blocks, each block comprising a plurality of entries. Each entry may be sorted in a predetermined order with respect to each other entry within the index storage subsystem. In one embodiment, the entries may be sorted in an ascending order. Each entry may be configured to store a fingerprint and pointer value pair corresponding to a data segment stored in the shared data storage. The pointer value may identify a location within the shared data storage holding a data segment corresponding to a received memory access request.

The file server may comprise a data structure for identifying a particular block of the plurality of blocks corresponding to a received memory access request. The index storage subsystem may determine whether an entry of the plurality of entries corresponding to the memory access request is located within the identified block. Based on this determination and whether the memory access request is a read request or a write request, the file server processes the memory access request accordingly. In one embodiment, the index storage subsystem is a solid-state disk (SSD). Limiting a number of queries to the SSD to one utilizing the data structure and batching received write requests may increase the benefits of using the SSD for storing fingerprint and pointer value pairs.

These and other embodiments will become apparent upon consideration of the following description and accompanying drawings.

Figure 1:
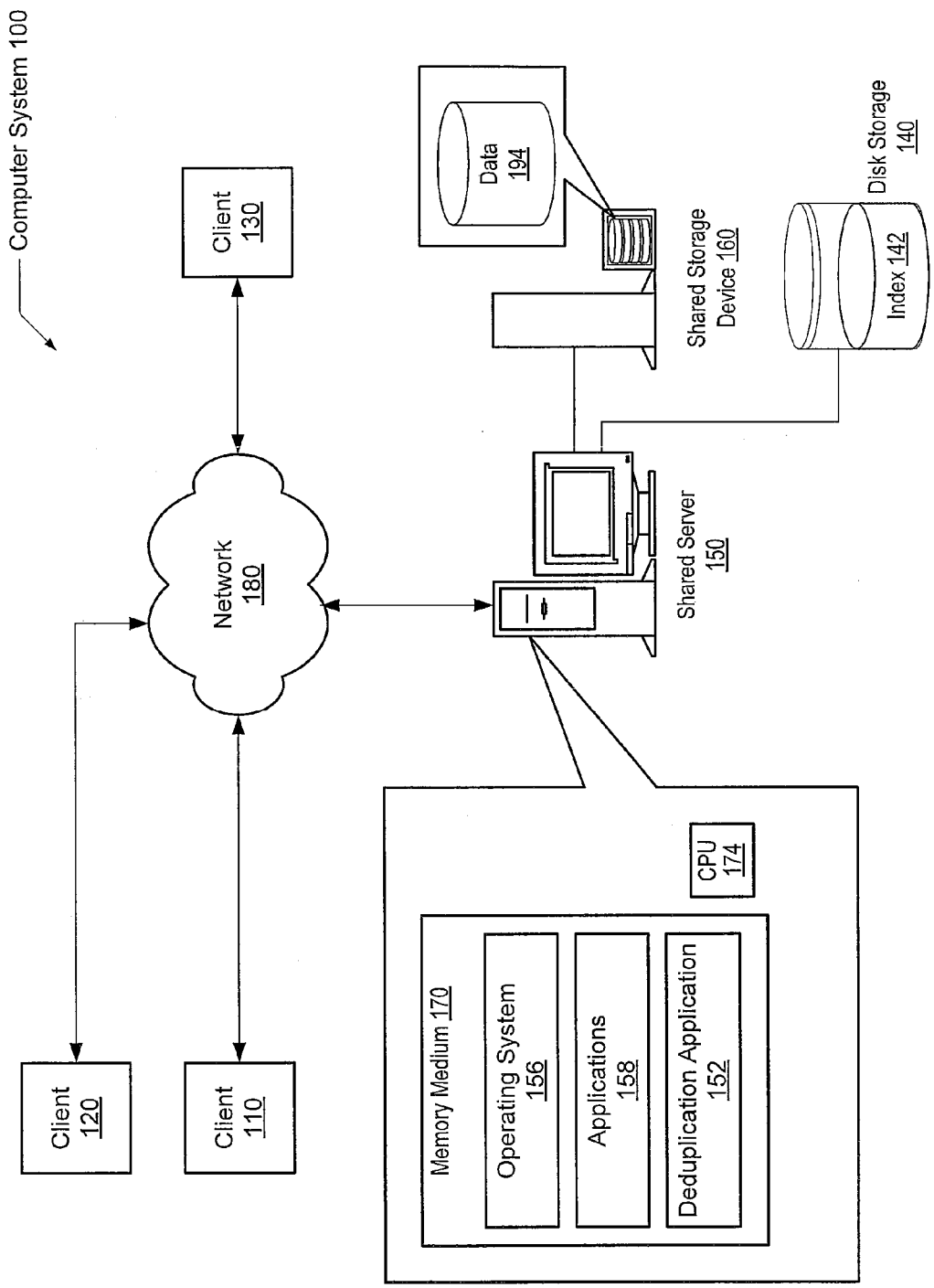
FIG. 1 is a generalized block diagram illustrating one embodiment of a computer system.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

In the following description, numerous specific details are set forth to provide a thorough understanding of the present invention. However, one having ordinary skill in the art should recognize that the invention may be practiced without these specific details. In some instances, well-known circuits, structures, signals, computer program instruction, and techniques have not been shown in detail to avoid obscuring the present invention.

FIG. 1 illustrates one embodiment of a computer system 100. As shown, system 100 includes clients 110, 120, and 130 interconnected through a network 180 to one another and to a shared server 150 comprising a deduplication software application 152. Shared storage device 160 is coupled to the shared server 150. In one embodiment, the shared server 150 is a file server and the shared storage device 160 is a shared disk storage. Clients 110, 120, and 130 are representative of any number of stationary or mobile computers such as desktop PCs, workstations, laptops, handheld computers, blade servers, etc. Clients 110-130 may execute software applications that utilize computer files corresponding to photographic or other still images, documents, video streams, audio files, or any other kind of data. Although system 100 is described as including client and servers, in alternative embodiments the functions performed by clients and servers may be performed by peers in a peer-to-peer configuration or by a combination of clients, servers, and peers.

In alternative embodiments, the number and type of clients, servers, and storage devices is not limited to those shown in FIG. 1. Almost any number and combination of servers, desktop, and mobile clients may be interconnected in system 100 via various combinations of modem banks, direct LAN connections, wireless connections, WAN links, etc. Also, at various times one or more clients may operate offline. In addition, during operation, individual client connection types may change as mobile users travel from place to place connecting, disconnecting, and reconnecting to system 100.

Within system 100, it may be desired to store data associated with any of clients 110, 120, and 130 within the shared storage 160. The shared storage 160 may include or be further coupled to storage consisting of one or more hard disks, tape drives, server blades, or specialized devices, and may include a variety of memory devices such as RAM, Flash RAM, MEMS (MicroElectroMechanical Systems) storage, battery-backed RAM, and/or non-volatile RAM (NVRAM), etc.

The shared server 150 may be configured to provide a location for the shared storage of computer files that comprise data that can be accessed by clients 110-130. Metadata describing the layout of data stored in the shared storage 160 may be stored in the shared server 150. A client may retrieve metadata from the shared server 150 in order to identify a desired data storage location within shared storage 160. In one embodiment, a separate disk storage, such as disk storage 140, may store an index 142. Index 142 as further described later may provide a complete and fast location identification of data stored in shared storage 160. The separate disk storage 140 may include a larger data storage space than is available within the shared server 150. In addition, the separate disk storage 140 may provide faster access times than a hard disk drive.

The separate disk storage 140 may include or be further coupled to storage consisting of a solid-state disk (SSD). A solid-state disk may also be referred to as a solid-state drive. An SSD utilizes solid-state memory to store persistent data and may emulate a hard disk drive (HDD) interface. In contrast to a HDD, an SSD utilizes solid-state electronics rather than electromechanical devices. Without moving parts or mechanical delays, an SSD may have a lower access time and latency than a HDD. In one embodiment, the separate storage device 140 may store a full index of hash values, or fingerprints, used to identify the locations of corresponding data included in the shared storage 160. Utilizing technology such as an SSD, the separate disk storage 140 may offer the ability to store a large fingerprint index with low access times.

In computer system 100, the shared server 150 may include an operating system 156 stored on the memory 170. Similar to clients 110-130, the operating system 156 on the shared server 150 may include Microsoft® Windows® operating system, Microsoft Windows Server® 2008 R2, UNIX®, Solaris®, or any other operating system. The operating system 156 and other software 152-158 may comprise program instructions stored on the memory 170 and executable by the central processing unit (CPU) 174. The CPU 174 may be referred to simply as processor 174. Similar to processors within clients 110-130, processor 174 may include circuitry for executing instructions according to a predefined instruction set. For example, the SPARC® instruction set architecture (ISA) may be selected. Alternatively, the x86, x86-64®, Alpha®, PowerPC®, MIPS®, PA-RISC®, or any other instruction set architecture may be selected. The processor 174 may utilize hardware design techniques such as superscalar, out-of-order execution and register renaming. Processor 174 may comprise a single core or multiple cores. In one embodiment, the processor 174 may be used in a single-processor configuration. In another embodiment, the processor 174 may be used in a multi-processor configuration.

The shared server 150 may comprise multiple applications 158 for different purposes such as a backup application. The deduplication application 152 may comprise program instructions that may reduce the amount of redundant data stored in the shared storage 160. When an application being executed on a client performs a store of a file, this file may be transferred to file server 150 through network 180. The deduplication application 152 may verify that data components of the file are unique. Verified unique data components of the file may be stored in shared storage 160. Data components of the file verified to be redundant data components may be made to reference to a corresponding copy already stored in shared storage 160.

Figure 2:
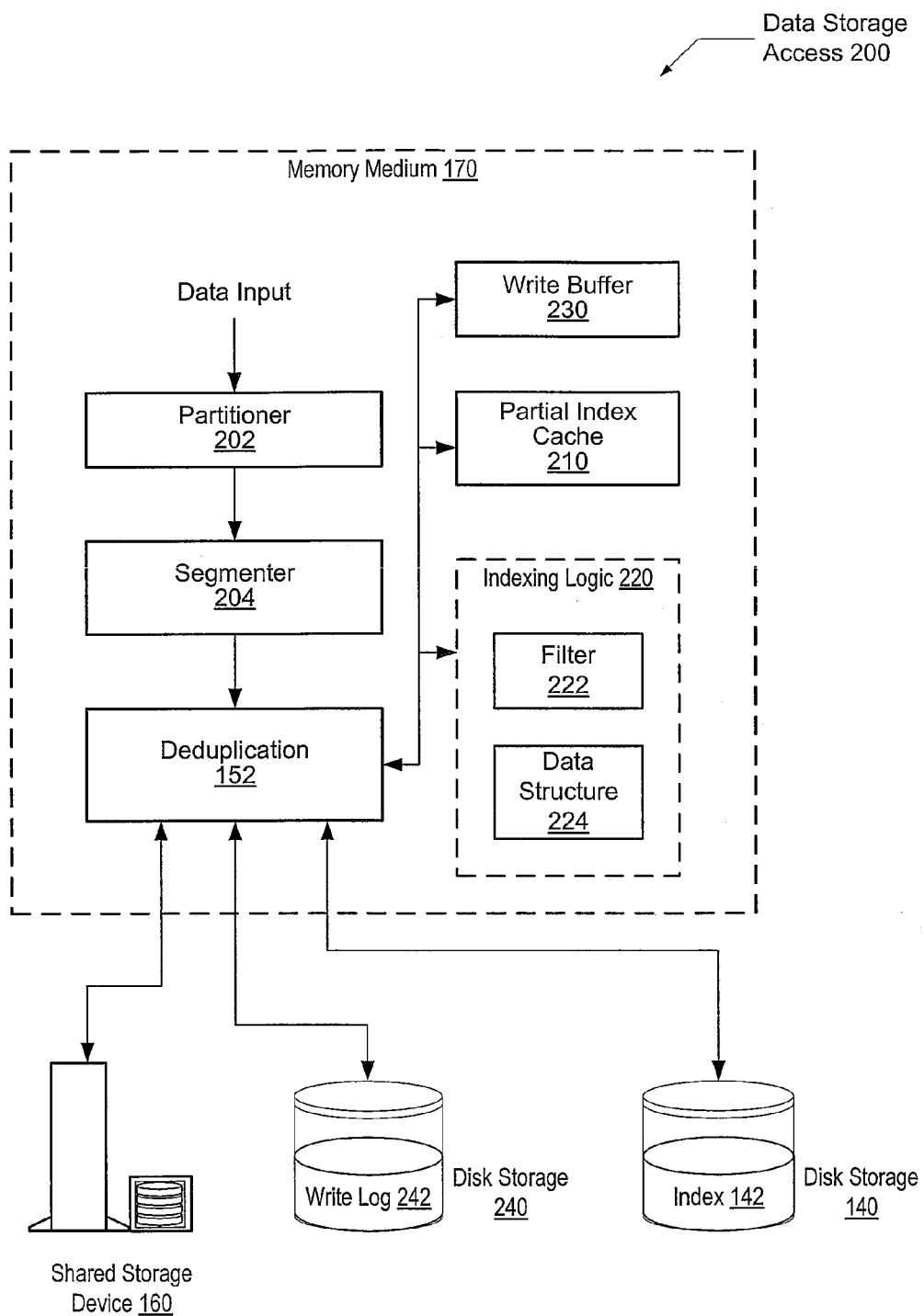
FIG. 2 is a generalized block diagram illustrating one embodiment of a data storage access.

Turning now to FIG. 2, one embodiment of a data storage access 200 is shown. Data corresponding to a computer file to be stored from a client may be partitioned. The data may be stored in units of a given size that may depend on the capacity of individual storage device locations. These units may be data objects, data portions, chunks, blocks or any other partition of data suited to the individual storage devices. In one embodiment, for a client backup process, a backup deduplication process performs a partitioning of the data and performs hash calculations on the client itself. A unit of data that has a same hash value as a unit of data already stored in shared storage 160 is not sent from the client. Rather, the shared storage 160 may be notified and create a pointer that references the stored copy. Therefore, by not sending the partitioned data, network traffic load may be reduced.

In another embodiment, for in-line deduplication, the deduplication application 152 on file server 150 performs a partitioning of the data, performs hash calculations to generate fingerprints, and performs comparisons of fingerprint values as data arrives to the file server 150 via network 180 as shown in FIG. 1. In yet another embodiment, for out-of-line deduplication, the data is first accumulated in an on-disk holding area within shared storage 160 and later the steps of partitioning, calculating hashes, and comparing fingerprints are performed. However, an on-disk holding area large enough to hold an entire backup window's worth of raw data may substantially diminish storage capacity within shares storage 160.

Although the functions of data processing may be described as occurring by deduplication application 152 residing within file server 150, and may typically occur here as data arrives to file server 150, it is noted the functionality may be performed in other locations if convenient. Additionally, deduplication application 152 may reside elsewhere. For example, deduplication application 152 may reside in storage 160, in a proxy coupled between the clients and storage, etc. Also, deduplication application 152 is described as one software application performing the steps for efficient deduplication. However, deduplication application 152 may include several smaller components and libraries and links to other programs to perform these steps. For simplicity, deduplication application 152 is shown as one entity.

The data sent from a client may be a data stream, such as a byte stream, received by partitioner 202. In one embodiment, segments are the data units of a given size used for storage in and retrieval from shared storage 160. As is well known to those skilled in the art, a segment is a sequence of chunks. Data streams may be divided into segments in a two-step process. First, in one embodiment, the data stream may be divided into a sequence of variable-length chunks using content-based chunk boundaries. A chunking algorithm within partitioner 202 may perform the dividing of the data stream. A chunk may be a sub-file content-addressable unit of data. A table may be used to map file types to a most appropriate chunking method. A file's type may be determined by referring to its file name extension.

A second step of the above two-step process includes segmentation. The resulting chunk sequence corresponding to a computer file may be broken into a sequence of segments using a segmenting algorithm within segmenter 204. Segments may be represented by a data structure that allows reconstruction of a segment from its chunks. The chunks later may be stored separately in one or more chunk containers in shared storage 160 to allow for sharing of chunks between segments. A segment's data structure may record its corresponding sequence of chunks including an associated calculated hash value, a pointer to its location on disk or other media within shared storage 160, and its length. Every stored segment may have such a data structure stored on disk or other media within shared storage 160.

For each segment produced by segmenter 204, the deduplication application 152 may calculate a corresponding hash value, or fingerprint. For example, a cryptographic hash function, such as Message-Digest algorithm 5 (MD5), Secure Hash Algorithm (SHA), or other, may be used to calculate a corresponding fingerprint. In order to know if a received given segment is already stored in shared storage 160, the calculated fingerprint for the given segment may be compared to fingerprints of segments stored in shared storage 160.

In one embodiment, a portion of a full index may be cached or stored in RAM. The partial index cache 210 may represent this partial storage. The shared storage 160, which holds the segments, may approach tens or hundreds of terabytes (TB) in capacity. Accordingly, a corresponding full index may be very large and may exceed the memory capacity of memory 170. The partial index 210 may not have the storage capacity to hold a fingerprint and pointer pair for each corresponding segment already stored in shared storage 160. For example, a system may include 16 gigabytes (GB) of RAM for the partial index 210. The system may use 8 KB for a segment size based on a predetermined segmenting algorithm, and may use 24 bytes per entry of the partial index 210 based on a predetermined hash function and pointer size. Such a system may only support 5.3 TB (e.g. 8 KB×16 GB/24 B) within shared storage 160. This supported value may be extremely low for modern standards.

Continuing with the potential sizes to support for the fingerprint index, a system with 100 TB of capacity within shared storage 160 and the same segment and index entry sizes of 8 KB and 24 B, respectively, as above, results in the system having 12.5E09 fingerprints (e.g. 100 TB/8 KB) to maintain. The partial index 210 would have a size of 300 GB (e.g. 12.5E09×24 B), which is an impractical RAM size for modern designs. Therefore, the partial index 170 may be stored in memory 170 and a full index 142 may be stored in the separate disk storage 140. The partial index 210 may store a table that maps a segment's fingerprint to a pointer indicating a location of where the associated segment is stored in shared storage 160. The calculated fingerprint for a received given segment may be used to query, or access, the partial index 210 for comparisons to be made.

If the query described above of the partial index 210 results in a hit, or matches a fingerprint already stored in the partial index 210, then it may be determined the given segment is already stored in the shared storage 160. Otherwise, if the query results in a miss, or there is no match found in the partial index 210, then the calculated fingerprint may be used to query the full index 142.

The full index 142 may be divided into blocks. In one embodiment, block sizes within the full index 142 may range from 4 kilobytes (KB) to 128 KB. Prior to sending a query to the separate disk storage 140, steps may be taken to determine which block within the full index 142 should be accessed. Therefore, only a single query may be sent from the shared server 150 comprising memory 170 to the separate disk storage 140.

In one embodiment, the indexing logic 220 may be accessed in order to maintain at most one query sent to the separate disk storage 140. For example, a filter 222 may be accessed to determine if the calculated fingerprint is not within the full index 142. The filter 222 may be a probabilistic data structure that determines whether an element is a member of a set. False positives may be possible, but false negatives may not be possible. One example of such a filter is a Bloom filter. If an access of filter 222 determines the calculated fingerprint is not in the full index 142, then accordingly the given segment is not stored in the shared storage 160. In such a case, no query is sent to the disk storage 140. If an access of filter 222 determines the calculated fingerprint is in the full index 142, then it is unknown whether the given segment is stored in the shared storage 160.

In order to maintain only a single query is sent to the disk storage 140 for the given segment, a determination may be made as to which particular block within the full index 142 may contain the calculated fingerprint. In one embodiment, a data structure 224 may be used to perform this determination. The data structure 224 may be a binary search tree, or an ordered binary tree, comprising a node-based data structure. The properties of this data structure may cause related sorting algorithms and search algorithms such as in-order traversal to be very efficient. In one embodiment, the data structure 224 is an AVL tree. The data structure 224 may determine which particular block within the full index 142 to search for the calculated fingerprint. If the calculated fingerprint is not found in the particular block, then accordingly the given segment is not stored in the shared storage 160.

The shared server 150 may include a write buffer 230 for batching insert operations to the disk storage 140. Calculated fingerprints that should be inserted into the full index 142 and have been found to be unique may be buffered in the write buffer 230. In this manner a series of insert operations may occur at a predetermined time in order to minimize the time that the full index 142 is inaccessible for lookup operations. In addition, the disk storage 140 may include an SSD, which may have significant write latencies. Batching the insert operations may reduce the effect of these latencies.

In addition to being coupled to the disk storage 140, the shared server 150 may be coupled to disk storage 240. In one embodiment, the disk storage 240 may include a HDD. The disk storage 240 may include a write log 242. In one embodiment, the write log 242 may be a copy of the write buffer 230 and used for security reasons. For example, if the data stored in the write buffer 230 is corrupted, lost or made inaccessible, then the write log 242 may be used as its replacement. In another embodiment, a number of insert operations that are batched may be large. The amount of storage space available in the write buffer 230 may not be sufficient to store all of the insert operations. Therefore, the write buffer 230 may store a portion of the total number of batched insert operations while the write log 242 stores the total number. Further details of the uses of the write buffer 230 and the write log 242 are provided later.

Figure 3:
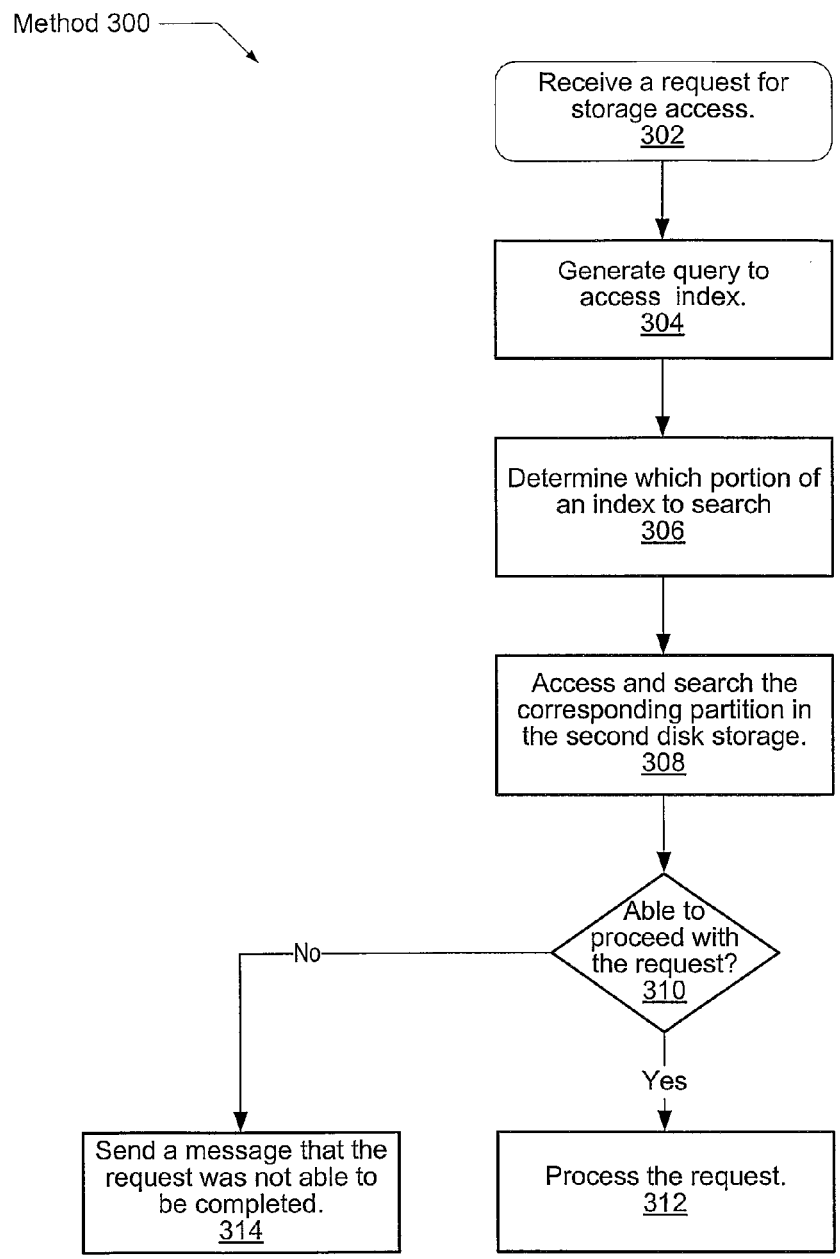
FIG. 3 is a generalized flow diagram illustrating one embodiment of a method for efficiently reducing latency of accessing an index for a data segment stored on a server.

Referring now to FIG. 3, one embodiment of a method 300 for efficiently reducing latency of accessing an index for a data segment stored on a server is shown. The components embodied in the computer system 100 and data storage access 200 described above may generally operate in accordance with method 300. For purposes of discussion, the steps in this embodiment are shown in sequential order. However, some steps may occur in a different order than shown, some steps may be performed concurrently, some steps may be combined with other steps, and some steps may be absent in another embodiment.

A computer system may comprise storage, such as a disk storage, coupled to a client via a network. A file server configured as a deduplication server may be coupled to the storage. Read and store (write) requests may be conveyed from the client to the file server in block 302, and these requests may be received via a network. The file server may determine if the corresponding data is redundant data. For example, in block 304, a query may be generated. In one embodiment, the query may comprise a fingerprint generated using a cryptographic hash function or other function. This fingerprint/hash value may be generated after the data has been divided into chunks and one or more segments have been formed with the chunks.

In various embodiment, a full fingerprint/hash index may be stored on a separate device (e.g., due to its large size exceeding memory capacity available on the file server). In one embodiment, the separate device may utilize technology for data storage that is different from a conventional hard disk drive (HDD). For example, the separate disk storage may include solid-state memory to store persistent data. In one embodiment, the separate disk storage comprises solid-state disk (SSD) technology.

The SSD differs from a HDD, which includes one or more rotating rigid platters on a motor-driven spindle and encodes data magnetically with read/write heads that float on a cushion of air above the platters. Generally speaking, SSD technologies provides lower read access latency times than HDD technologies. However, the write performance of SSDs is significantly impacted by the availability of free, programmable blocks within the SSD. As the write performance of SSDs is significantly slower compared to the read performance of SSDs, problems may occur with certain functions or operations expecting similar latencies. Batching of the write operations may be used to alleviate this problem.

An SSD may have a large number of blocks. An SSD with a size of 1 TB and comprising 128 KB blocks may have 7.81E06 blocks (e.g. 1 TB/128 KB). Larger disks with smaller blocks will have a far larger number of blocks. A separate disk storage used to store a full fingerprint/hash index and comprising an SSD may have a large number of blocks for storing pairs of fingerprint and pointer pairs. In addition, a comparison to each or even a fraction of the large number of blocks within the SSD may reduce performance. Therefore, a determination as to which particular block of the large number of blocks to search within the SSD may significantly improve read latency times.

In block 306 of method 300, an identification of a particular portion of a fingerprint index to search is made. For example, in one embodiment the fingerprint index comprises a plurality of blocks, each including one or more entries. Rather than searching the entire index, a particular block of the index may be identified for searching. The identified block may then be conveyed as part of the query discussed above as part of block 304 of the method. It is noted that blocks 304 and 306 of the method could be performed in either order or concurrently. The identified block (portion of the index) within the SSD may then be searched for a fingerprint corresponding to the received request. In various embodiments, this index may be a stored such that it is sorted based on fingerprint values. Additionally, in various embodiments the index may be stored to occupy a last portion of the SSD. For example, if the full index has a size of 10 GB, then the full index may occupy the last 10 GB of the SSD. The empty, or available, space of the SSD is then located at the beginning of the SSD. Such a storage configuration may cause merge (insert) operations to be performed in a relatively easy and fast manner. In other embodiments, the index may be stored in other locations within the SSD. Numerous such alternatives are possible and are contemplated.

In one embodiment, the file server stores a data structure used for identifying the particular block mentioned above to search in the index. In one embodiment, the data structure may comprise an AVL tree in memory. Other data structures are possible and are contemplated. In one embodiment, the AVL tree includes nodes, wherein each node includes data identifying a first entry of each SSD block in the fingerprint index. Two basic operations of the AVL tree may include search operations that identify a particular block within the SSD based on a given fingerprint value. For example, a first operation may take the given fingerprint value as an input and provide as an output identification of a block in the index whose first entry includes a fingerprint value that is a smallest value of all first entry fingerprint values that are greater than the given fingerprint. As a simple example, five blocks in an index identified as blocks 1 to 5 may each contain multiple entries corresponding to multiple fingerprints. Each of blocks 1 to 5 may also have a first entry with fingerprint values of 8, 20, 40, 170 and 300, respectively. For a given fingerprint value of 33, the first AVL operation may identify block 3, since block 3 has a corresponding first entry fingerprint value of 40. The fingerprint value of 40 is a smallest value of the set {40, 170, 300}, wherein each value in this set is greater than the given fingerprint value of 33. This first AVL operation may be referred to as avl_search_max(fp), wherein "fp" represents a fingerprint.

A second AVL operation may take the given fingerprint value as an input and provide as an output identification of a block with a first entry including a fingerprint value that is a largest value of all first entry fingerprint values that are less than the given fingerprint. Continuing with the simple example given above, for a given fingerprint value of 33, the second AVL operation may identify block 2, since block 2 has a corresponding first entry fingerprint value of 20. The fingerprint value of 20 is a largest value of the set {8, 20}, wherein each value in this set is less than the given fingerprint value of 33. This second AVL operation may use a pneumonic such as avl_search_min(fp).

As noted above, an embodiment may include a sorted full index stored in ascending order within the SSD such as shown in the above simple example. Therefore, either of the two AVL operations may be used to determine which particular block of a large number of blocks to search within the SSD. Utilizing the AVL tree, or any other data structure and corresponding operations, then serves to limit a number of SSD accesses to one for determining whether a given fingerprint value is already stored in the full index. In addition, a filter such as a bloom filter described earlier may be used to speed up the determination process. In block 308, a query message is sent to the SSD with identification of a particular block to search for the given fingerprint value.

For a lookup request, a hit within the full index indicates the lookup request may proceed. For an insert request, a miss within the full index indicates the insert request may proceed, although batching of the request may be performed as part of proceeding with the request. If it is determined the request may proceed (conditional block 310), then the request is processed in block 312. For a lookup request, a corresponding pointer value may be returned from the SSD (the separate disk storage) to the file server. The file server may then access the shared storage with the pointer value to retrieve the requested segments of data. For an insert request, a response may be sent from the SSD to the file server to batch the insert request. At a later predetermined time, the insert operation may be performed with a number of other batched insert operations. These steps are further described later.

If it is determined the request may not proceed (conditional block 310), then a corresponding message may be sent from the SSD to the file server. Accordingly, the file server may send a message to the client to informing the client that the request may not be completed. It is noted that a bloom filter may make this determination at an earlier stage, such as in step 306 of method 300. Next, further details of a lookup request and an insert request are provided below.

Figure 4:
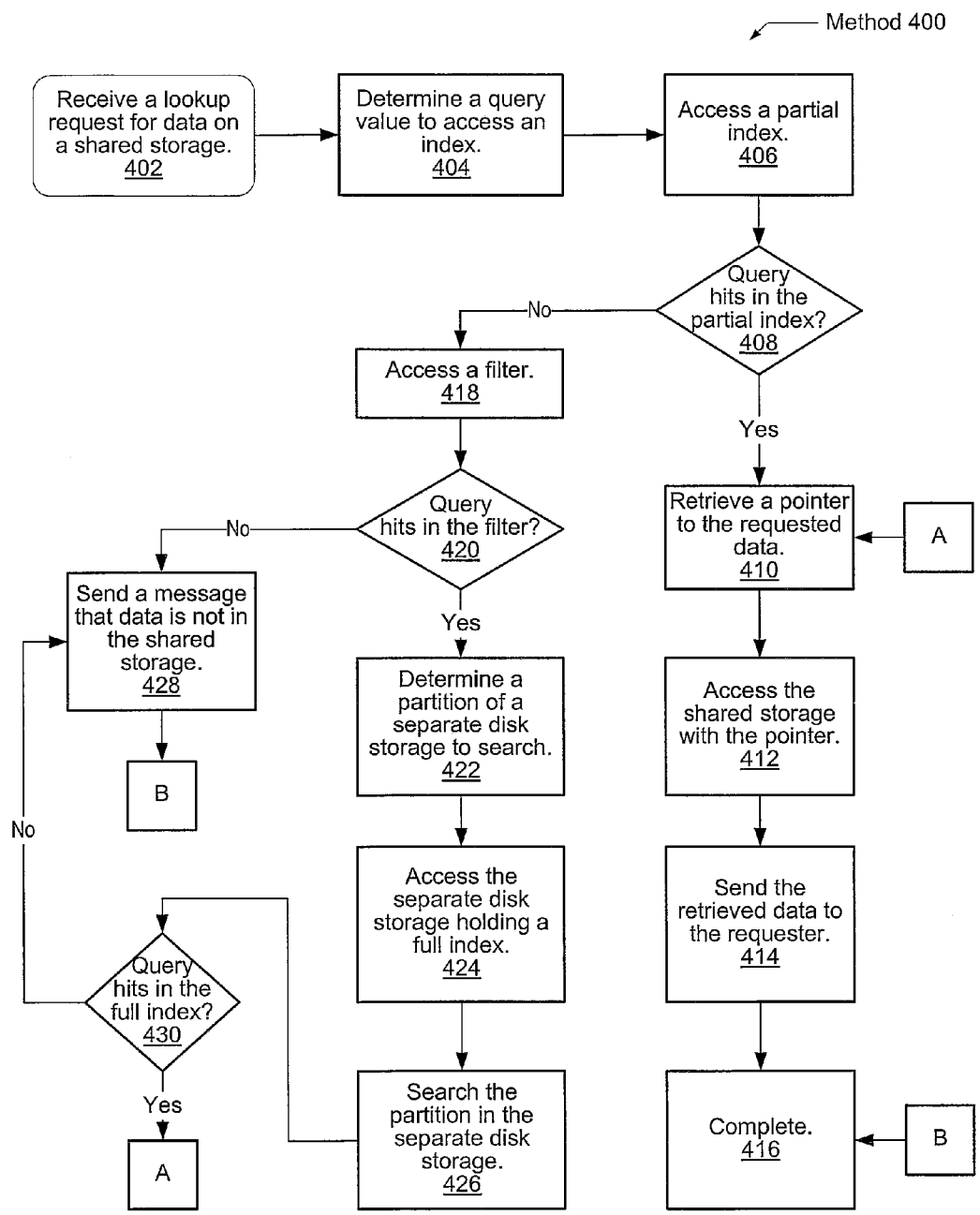
FIG. 4 is a generalized flow diagram illustrating one embodiment of a method for performing a lookup request on a full index corresponding to a shared single-instance storage.

Referring now to FIG. 4, one embodiment of a method 400 for efficiently performing a lookup request on a full index corresponding to a shared single-instance storage is shown. The components embodied in the computer system 100 and data storage access 200 described above may generally operate in accordance with method 400. For purposes of discussion, the steps in this embodiment are shown in sequential order. However, some steps may occur in a different order than shown, some steps may be performed concurrently, some steps may be combined with other steps, and some steps may be absent in another embodiment.

In block 402, a file server comprising a deduplication application receives a read request. In one embodiment, the file server corresponds to the shared server 150 shown in FIG. 1. A client 110 may have sent the read request via network 180. In one embodiment, the file server comprises a file system, wherein the file system operates as a special-purpose database for the storage, organization, manipulation, and retrieval of data. The file system may provide access to data by operating as clients for a network protocol. In one embodiment, the file system may include a data structure referred to as an mode that stores basic information about a file, an item, a directory, or other file system object. Inodes may store user and group ownership information, access mode (read, write, execute permissions) information and type of file.

The read request may contain mode information such as an mode number used to locate the appropriate data block(s) targeted by the read request. If the original data block has been placed in more than one data chunk, then the block will point to each of those chunks. The mode number may be used to query a table of modes in a known location on the file server. Using the mode number, the kernel of the corresponding operating system 156 may access the contents of the mode. The kernel may read corresponding data pointers and accordingly the contents of the file or file system object. In one embodiment, the kernel may determine corresponding fingerprints of each of the identified data chunks. The corresponding fingerprints may be stored in a predetermined table or map.

In block 404, the fingerprints corresponding to the read request are determined, such as from an associated mode number. For each fingerprint, in block 406, a partial index may be accessed. The partial index may be stored in a data-cache, in RAM or other memory within the file server. The partial index may be a portion of a full index stored off of the file server. In addition, a write buffer of pending write operations (insert operations) may be stored in a data-cache, in RAM or other memory within the file server. The write buffer may be queried simultaneously with a query of the partial index.

If a query of the partial index or the write buffer results in a hit (conditional block 408), then in block 410, a corresponding data pointer may be retrieved. In addition, one or more fingerprint-pointer value pairs may be prefetched into a higher level of a memory hierarchy in order to take advantage of spatial locality and temporal locality. In block 412 a single-instance shared storage, such as shared storage 160 shown in FIG. 1, may be accessed with the retrieved data pointer. The corresponding retrieved chunks may be combined with other data chunks corresponding to the requested file or other file system object. In block 414, the corresponding retrieved file may be sent to the requester, such as client 110.

If a query of the partial index or the write buffer does not result in a hit (conditional block 408), then in block 418, a filter is accessed. The filter, such as a Bloom filter described earlier, may be accessed simultaneously with the access of the partial index and the write buffer. If the query of the filter does not result in a hit (conditional block 420), then in block 428, a message may be sent from the file server to the requesting client indicating the requested data is not stored on the shared storage. Control flow of method 400 then moves via block B to block 416 where the process for this read request is completed.

If the query of the filter results in a hit (conditional block 420), then it still indeterminate whether the fingerprint is stored in the full index and accordingly whether the corresponding data chunk is stored in the shared storage. In block 422, a determination is made of which partition, or block, of the full index may store the requested fingerprint. The full index, which is stored off of the file server in a separate disk storage, may comprise a large number of blocks. In one embodiment, a data structure, such as an AVL tree, may be queried to perform this determination as described earlier. In block 424 the separate disk storage is accessed and queried with the requested fingerprint and an identifier of the located block. In block 426, the block within the separate disk storage is searched to determine whether the requested fingerprint is located within the block. If the query of the identified block within the full index results in a hit (conditional block 430), then control flow of method 400 moves via block A to block 410. Otherwise, control flow of method 400 moves to block 428.

Figure 5:
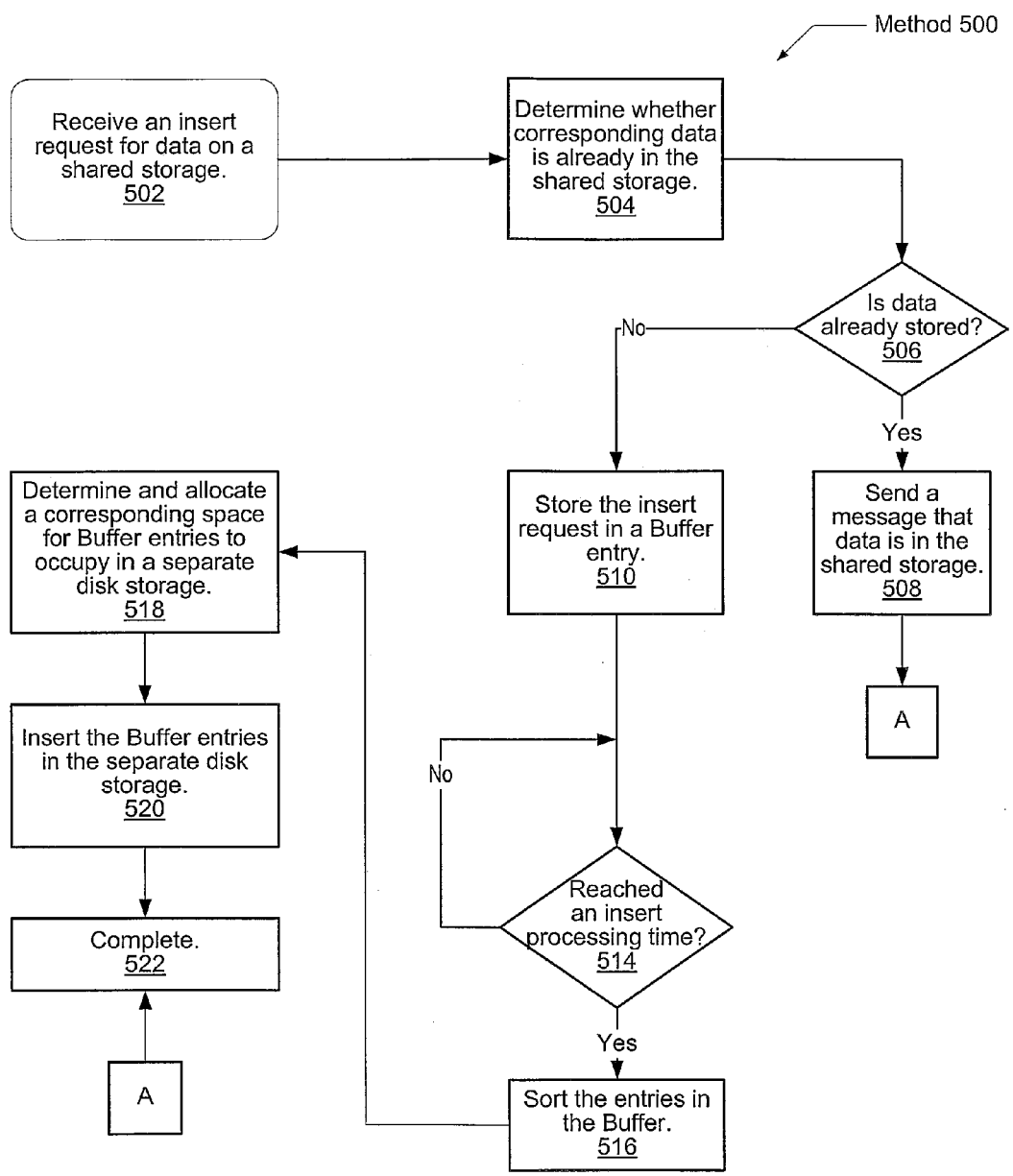
FIG. 5 is a generalized flow diagram illustrating one embodiment of a method for efficiently performing an insert request on a full index corresponding to a shared single-instance storage.

Turning now to FIG. 5, one embodiment of a method 500 for efficiently performing an insert request on a full index corresponding to a shared single-instance storage is shown. The components embodied in the computer system 100 and data storage access 200 described above may generally operate in accordance with method 500. For purposes of discussion, the steps in this embodiment are shown in sequential order. However, some steps may occur in a different order than shown, some steps may be performed concurrently, some steps may be combined with other steps, and some steps may be absent in another embodiment.

In block 502, a file server, such as the file server described above regarding method 400, receives a write request. A write request may be referred to as an insert request, since the file to be added to the shared storage has a corresponding fingerprint and pointer value to be inserted in the full index. In block 504, a determination is made whether the corresponding data of the write request is already stored in the shared storage. For example, the steps of method 400 may be used to perform this determination.

If the corresponding data of the write request is already stored in the shared storage (conditional block 506), then in block 508, a message may be sent from the file server to the requesting client indicating the data is already stored on the shared storage. Control flow of method 500 then moves via block A to block 522 where the process for the write request is completed. If the corresponding data of the write request is not already stored in the shared storage (conditional block 506), then in block 510, the write request may be stored in an entry in a write buffer, such as write buffer 230 shown in FIG. 2. In one embodiment, write requests may be stored in an append-only fashion. Therefore, any lookup requests querying the write buffer may find a correctly ordered write request of two or more write requests to a same data segment. During the processing of lookup requests, the write buffer may be queried to determine if the file server stores requested data. If the file server does store the requested data, then no query of a separate disk storage, such as an SSD, may be performed. Rather the lookup request may be served from the write buffer as described above regarding step 408 of method 400.

In addition to placing the write request in the write buffer, the write request may be stored in a write log on a separate disk storage, such as write log 242 shown in FIG. 2. The write log may be used for security reasons or to store a large number of write requests as described earlier. In the latter case, the write buffer may store a subset of a total number of write requests.

The write requests may continue to be stored, or batched, until a predetermined event occurs. In one embodiment, a timer, a counter or a scheduled timestamp may be used to determine when to process the write requests. In another embodiment, when an amount of available space within the write buffer is below a predetermined threshold, the write requests may be processed. If a predetermined processing time for the write requests is reached (conditional block 514), then in block 516, the entries within the write buffer may be sorted based on fingerprint values. In other embodiments, the entries may be loaded from the write log and sorted. The sorted entries may be returned to the write log afterward. In one embodiment, the corresponding fingerprint values may be sorted in an ascending order. The sorting matches the sorting of the fingerprint values stored in the full index. Therefore, if the fingerprint values are sorted in an ascending order in the full index within the separate disk storage, then the entries within the write buffer are sorted by ascending fingerprint values. In one embodiment, the separate disk storage may be made unavailable until the entries are inserted.

In block 518, the amount of space to allocate within the separate disk storage to store the entries held in the write buffer is determined. In one embodiment, a number of entries to allocate may be determined. In another embodiment, a number of blocks within the separate disk storage may be determined. Other possibilities for the granularity of the allocated space are possible and contemplated. In block 520, the sorted entries held within the write buffer (or the write log) are inserted between entries stored in the separate disk storage. In one embodiment, a modified version of an algorithm such as mergesort may be utilized to optimize an amount of data shifting and a number of comparisons.

A simple example may include fingerprint values 34, 23, 89, 67, 105 cached in the write buffer. After sorting in an ascending order, the corresponding entries may be stored in a list in the following order: 23, 34, 67, 89 and 105. In one embodiment, the two AVL operations (avl_search_min( ) and avl_search_max( )) described earlier may be used to insert the entries in the separate disk storage. The avl_search_min( ) operation may be invoked on an AVL tree for a sorted entry with a smallest fingerprint value, such as 23 in the simplified example. Therefore, a block within the separate disk storage starting with the largest entry that is smaller than 23 may be identified. In this example, this block may be identified as block X. The avl_search_max( ) operation may be invoked on the AVL tree for a sorted entry with a largest fingerprint value, such as 105 in the simplified example. Therefore, a block within the separate disk storage starting with the smallest entry that is larger than 105 may be identified. In this example, this block may be identified as block Y.

Continuing with the above example, it is known all sorted entries within the write buffer will be inserted between blocks X and Y. In one embodiment, all blocks located prior to block X within the separate shared storage are shifted by a number of blocks determined in step 518 of method 500. For example, if two blocks are determined to be allocated for the inserted entries, then block X-1 may be shifted to X-3. Similarly, block X-2, may be shifted to block X-4 and block 1 may be shifted two spaces towards the beginning of the separate disk storage, such as an SSD. A prior check may be used to ensure that the SSD has sufficient space. Also, the shift operation may be performed in large block sizes. Afterward, two pointers may be used to perform a walk-through of the two sorted lists of entries: the SSD blocks between blocks X and Y, and the sorted list of new fingerprints stored in the write buffer (or write log).

Continuing with the above example, at any given time, an entry within the write buffer corresponding to the smallest fingerprint may be inserted in a current location within the SSD as identified by a pointer. Afterward, the relevant pointer may be advanced. The current location corresponds to a space that was created on the previous step beginning at block X-i, wherein i corresponds to the number of blocks determined to be allocated for the new entries. As the entries are inserted in the full index, a corresponding pointer value to an associated location in the shared storage is stored with a fingerprint value.

In addition to the above, when deleting a fingerprint from the index the delete operation may be logged in an append-only log, in a way similar to the way insert operations may be logged. In one embodiment, if the fingerprint is found in the memory cache, then its entry may be modified or (e.g., converted to a "negative" cache (write buffer) entry) or otherwise indicate that the fingerprint is no longer present in the system. If the fingerprint is not found in the cache, then an entry such as the above mentioned "negative" entry is created. Subsequently, when the time comes for an update to the SSD, the deletion entries are also processed and the relevant fingerprints are removed from the SSD. Further, in various embodiments, the sorted list of entries may also be compacted if a fingerprint is added and then deleted (e.g., an insert fingerprint followed by a delete of the same fingerprint will result in the fingerprint not being added to the SSD index).

It is noted that the above-described embodiments may comprise software. In such an embodiment, program instructions and/or a database (both of which may be referred to as "instructions") that represents the described systems and/or methods may be conveyed or stored on a computer readable medium. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, or DVD-ROM, CD-R, CD-RW, DVD-R, DVD-RW, or Blu-Ray. Storage media may further include volatile or non-volatile memory media such as RAM (e.g. synchronous dynamic RAM (SDRAM), double data rate (DDR, DDR2, DDR3, etc.) SDRAM, low-power DDR (LPDDR2, etc.) SDRAM, Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. Storage media may include microelectromechanical systems (MEMS), as well as storage media accessible via a communication medium such as a network and/or a wireless link.

In various embodiments, one or more portions of the methods and mechanisms described herein may form part of a cloud computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computer system comprising:
a server comprising a processor and a memory;
an index comprising a plurality of blocks, wherein each block comprises a plurality of entries, each entry including a fingerprint and an identifier which identifies where a corresponding data segment is stored within a data storage subsystem;
wherein in response to receiving a storage access request corresponding to a given fingerprint, the server is configured to:
access a data structure comprising a plurality of entries, wherein each entry of the plurality of entries identifies a block of the plurality of blocks, and a fingerprint corresponding to a first entry of the block;
responsive to said access of the data structure, identify a particular block of the plurality of blocks corresponding to the storage access request; and
responsive to identifying the particular block, send a query corresponding
to the particular block to the index;
wherein in response to the query, the index is configured to convey a response to the server that indicates whether the given fingerprint is included within the particular block;
wherein the plurality of blocks of the index are sorted based on a value of an entry in a given block, and wherein responsive to said access of the data structure the particular block identified is one of:
a block in the index whose first entry includes a fingerprint value that is a smallest value of all first entry fingerprint values that are greater than the given fingerprint; and
a block with a first entry including a fingerprint value that is a largest value of all first entry fingerprint values that are less than the given fingerprint.

2. The system as recited in claim 1, wherein the data structure comprises a binary search tree, and wherein the index is stored on a solid-state disk (SSD).

3. The system as recited in claim 1, wherein said data structure is searched based on a fingerprint value.

4. The system as recited in claim 2, wherein the server is further configured to store a subset of the index in a cache, and wherein prior to accessing the index stored on the SSD, the server is configured to access said subset to determine whether the particular block is included therein.

5. The system as recited in claim 3, wherein the server is further configured to prefetch information from the index to be stored in the cache, in response to sending the query to the index, wherein the prefetched information has a spatial or temporal locality associated with the query.

6. The system as recited in claim 1, wherein the server is further configured to store the storage access request in a write buffer in response to determining the memory access request is a write request and the query results in a miss.

7. The system as recited in claim 6, wherein the server is further configured to add new entries to the index in a manner that preserves a sort order of the index.

8. A computer implemented method comprising:
maintaining an index comprising a plurality of blocks, wherein each block comprises a plurality of entries, each entry including a fingerprint and an identifier which identifies where a corresponding data segment is stored within a data storage subsystem;
receiving a memory access request at a server;
accessing a data structure comprising a plurality of entries, wherein each entry of the plurality of entries identifies a block of the plurality of blocks, and a fingerprint corresponding to a first entry of the block;
responsive to said access of the data structure, identifying a particular block of the plurality of blocks corresponding to the storage access request;
responsive to identifying the particular block the server sending a query corresponding to the particular block to the index;
the index conveying a response to the server that indicates whether the given fingerprint is included within the particular block, responsive to the query;
wherein the plurality of blocks of the index are sorted based on a value of an entry in a given block, and wherein responsive to said accessing of the data structure the particular block identified is one of:
a block in the index whose first entry includes a fingerprint value that is a smallest value of all first entry fingerprint values that are greater than the given fingerprint; and
a block with a first entry including a fingerprint value that is a largest value of all first entry fingerprint values that are less than the given fingerprint.

9. The method as recited in claim 8, wherein the data structure comprises a binary search tree within a first device, and wherein the index is stored on a solid-state disk (SSD) separate from the first device.

10. The method as recited in claim 9, wherein the server is further configured to store a subset of the index in a cache, and wherein prior to accessing the index stored on the SSD, the method comprises the server accessing said subset to determine whether the particular block is included therein.

11. The method as recited in claim 10, wherein the method further comprises the server prefetching information from the index to be stored in the cache, in response to sending the query to the index, wherein the prefetched information has a spatial or temporal locality associated with the query.

12. The method as recited in claim 8, further comprising searching the data structure based on a fingerprint value.

13. The method as recited in claim 8, wherein the server is further configured to store the memory access request in a write buffer in response to determining the memory access request is a write request and the query results in a miss.

14. The method as recited in claim 13, further comprising the server adding new entries to the index in a manner that preserves a sort order of the index.

15. A non-transitory computer-readable medium storing program instructions that are executable to:
 maintain an index comprising a plurality of blocks, wherein each block comprises a plurality of entries, each entry including a fingerprint and an identifier which identifies where a corresponding data segment is stored within a data storage subsystem;
 receive a storage access request at a server;
 access a data structure comprising a plurality of entries, wherein each entry of the plurality of entries identifies a block of the plurality of blocks, and a fingerprint corresponding to a first entry of the block;
 responsive to said access of the data structure, identify a particular block of the plurality of blocks corresponding to the storage access request;
 responsive to identifying the particular block, cause the server to send a query corresponding to the particular block to the index; and
 cause the index to convey a response to the server that indicates whether the given fingerprint is included within the particular block, responsive to the query;
 wherein the instructions are further executable to sort the plurality of blocks of the index based on a value of an entry in a given block, and wherein responsive to said access of the data structure the particular block identified is one of:
 a block in the index whose first entry includes a fingerprint value that is a smallest value of all first entry fingerprint values that are greater than the given fingerprint; and
 a block with a first entry including a fingerprint value that is a largest value of all first entry fingerprint values that are less than the given fingerprint.

16. The non-transitory computer-readable medium as recited in claim 15, wherein the data structure comprises a binary search tree within a first device, and wherein the index is stored on a second device separate from the first device.

17. The non-transitory computer-readable medium as recited in claim 16, wherein the second device is an SSD device.

* * * * *